Dec. 26, 1950
I. J. MENSCHIK ET AL
2,535,945
DRY ELECTROLYTIC CONDENSER
Filed April 10, 1946
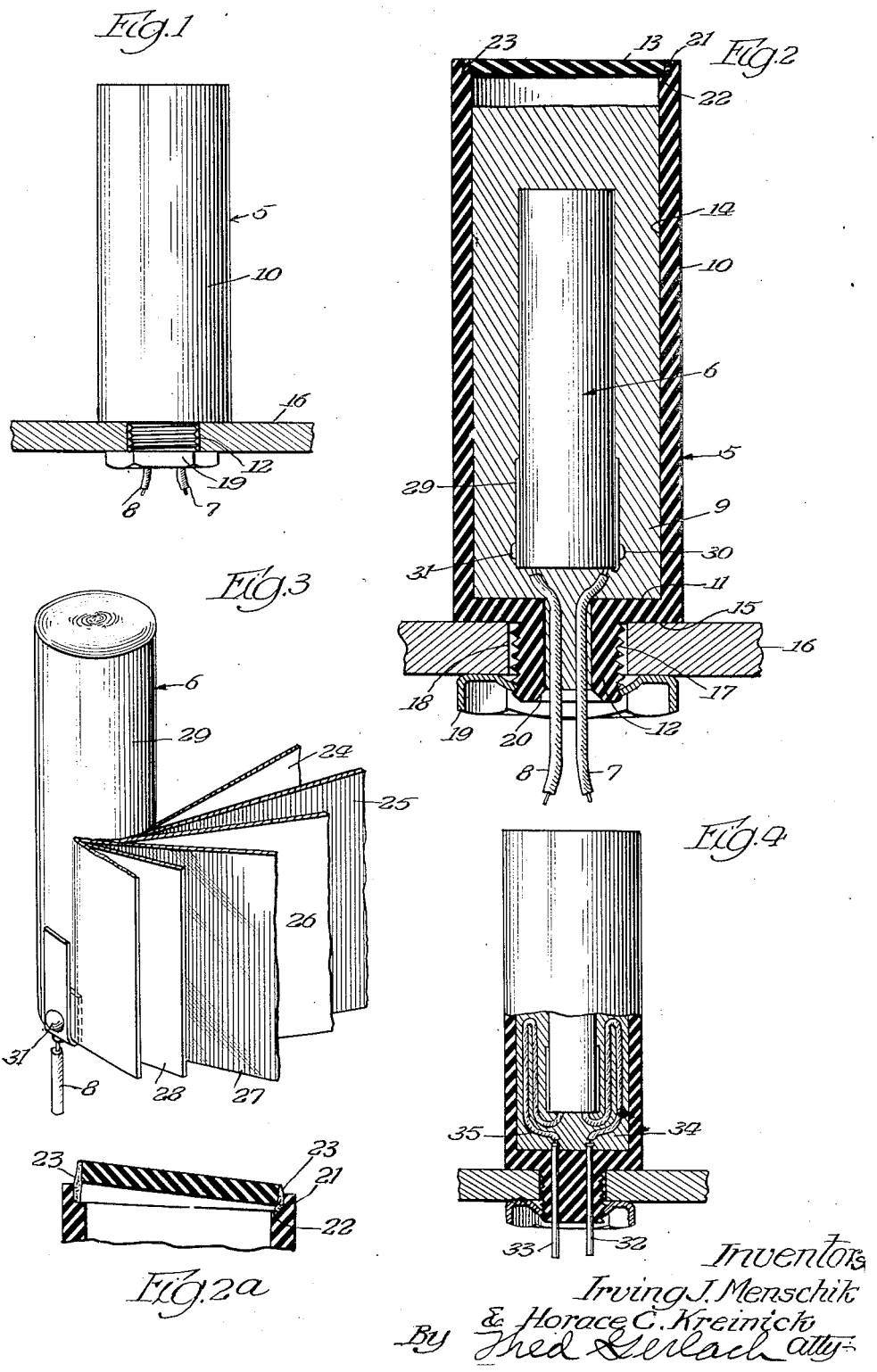
Inventors
Irving J. Menschik
& Horace C. Kreinick
By Fred Gerlach Atty

UNITED STATES PATENT OFFICE 2,535,945

DRY ELECTROLYTIC CONDENSER

Irving J. Menschik and Horace C. Kreinick, Chicago, Ill., assignors to American Condenser Co., Chicago, Ill., a partnership consisting of Irving J. Menschik and Estelle R. Menschik Application April 10, 1946, Serial No. 660,891

4 Claims. (Cl. 175—315)

The present invention relates generally to dry electrolytic condensers and more particularly to that type of electrolytic condenser which as its principal components or parts comprises: (1) an upstanding shell consisting of a continuous side wall and a top, and in addition a bottom having a tubular externally threaded neck which is adapted to extend through a hole in the chassis or frame of a radio receiver or other electric unit and to have a nut applied to its lower end for clamping the shell in place with respect to the chassis or frame; (2) a condenser unit which is disposed within the central portion of the shell interior and is in the form of a plurality of contiguous spirally wound strips, two of which form the positive and negative plates of the unit and are formed of foil of aluminum or other so-called "valve" metal, and the remainder of which are formed of paper or like flexible material impregnated or saturated throughout with viscous electrolyte and are arranged in alternating relation with the strips of metallic foil in order to space the latter strips apart; (3) a pair of conductors which are electrically connected to the two strips of metallic foil, respectively, and extend or lead through the externally threaded neck of the shell; and (4) a filling of wax or like insulating material which substantially fills the interior of the shell and serves to space the condenser unit from the side wall and the bottom and top of the shell.

In a dry electrolytic condenser of this type it has heretofore been standard practice (a) to make the shell of drawn aluminum, (b) to surround the condenser unit with an open ended sleeve of varnished cardboard in order to prevent the unit from contacting the shell in the event of melting or softening of the wax filling due to high heat conditions, and (c) to insulate the conductors from the inner periphery or surface of the externally threaded neck by way of a grommet of hard rubber or like insulating material. In practice it has been found that a dry electrolytic condenser of the aluminum shell variety has certain inherent disadvantages and lacks the necessary efficiency and stability to make it a satisfactory and practical device. In the first place the electrolyte often, due to high heat conditions, flows through the always present voids in the wax filling into contact with the aluminum shell which in normal use of the condenser is at neutral potential due to it being grounded by way of the chassis of the radio receiver or other electrical unit in which the condenser is employed. When in connection with a dry electrolytic condenser of the aluminum shell variety the electrolyte flows into contact with the aluminum shell two effects are created or produced, when, for instance, the positive and negative foils are at different but positive voltages and the aluminum shell is grounded or at zero voltage. The first effect involves the creation or formation of a condenser consisting of the negative foil of the condenser unit and the aluminum shell. In such condenser the aluminum shell becomes the negative plate and the negative foil of the condenser unit becomes the positive plate. When the negative foil becomes the positive plate of the condenser consisting of the aluminum shell and the negative foil a dielectric film is built up on the negative foil due to an anodizing process or operation involving the electrolyte, and such film tends materially to reduce the capacity of the regular condenser unit consisting of the positive and negative metallic foils and results in the condenser as a whole operating at greatly reduced capacity over its rated capacity and producing objectionable or undesirable electrical effects, such, for example as a humming noise in the audible output of the radio receiver with which the condenser is used. The second effect resulting from the electrolyte contacting the aluminum shell results in the creation or formation of a condenser consisting of the positive metallic foil of the condenser unit and the aluminum shell. Such created condenser operates at a materially higher voltage than the regular condenser consisting of the positive and negative metallic foils and is subject to two possibilities. The first possibility is that an additional or increased dielectric film will build up on the positive metallic foil of the condenser unit. If this occurs there is a further diminution in the capacity of the condenser unit over its normal or rated capacity and resultantly there is an increased hum in the audible output of the radio receiver. The second possibility is that no additional or increased dielectric film builds up on the positive metallic foil of the condenser unit due to impurities in such foil. If this occurs the electrolyte in contact with the aluminum shell short circuits the condenser consisting of the positive metallic foil and the shell and ultimately results in a complete break down of the condenser as a whole. In the event of either total or partial break down of the condenser the rectifier tubes, transformer and other operating parts of the radio receiver or other electrical unit with which the condenser is employed are subjected to such overload or strain as to incapacitate and irreparably damage them. A second disadvantage of a dry electrolytic condenser with an aluminum shell resides in the fact that it is necessary to employ an open ended sleeve of varnish cardboard around the condenser unit and a grommet of hard rubber in the externally threaded neck on the bottom of the shell. Utilization of a sleeve and grommet serves materially to increase the cost of the condenser and is subject to certain objection. The sleeve has proven in practice not to be effective in insulating the condenser unit from the aluminum shell because it must by necessity be open ended and hence there is a possibility of the electrolyte contacting the aluminum shell by passing through the open ends of the sleeve. In addition, the electrolyte, regardless of whether it is formed for the most part of glycerine or ethylene glycol, is a solvent for the varnish and hence when it flows into contact with the sleeve it dissolves the varnish and renders the sleeve useless as an insulator. The use of a grommet of rubber in the externally threaded neck is subject to the objection that it not only increases the cost of production, but also makes assembly of the condenser difficult, especially in connection with threading of the conductors through the neck. A third disadvantage in employing in connection with a dry electrolytic condenser of the type under consideration a shell of aluminum resides in the fact that the aluminum shell is highly conductive of heat and hence there is a possibility that locally developed heat will be transferred to, and effect melting of, the wax in the shell. In addition, an aluminum shell under certain conditions is subject to corrosion and has but a comparatively short life.

One object of the instant invention is to provide a dry electrolytic condenser which is an improvement upon, and eliminates the aforementioned disadvantages and defects of, a dry electrolytic condenser of the aluminum shell variety by reason of the fact that it comprises a shell which is formed solely of solid, rigid, molded, "plastic" type resinous material having extremely high electrical and heat insulating properties. By employing a shell of such material instead of aluminum the shell cannot become a part of the electric circuit for the condenser even though the electrolyte flows into contact with the shell. By having the shell form no part whatsoever of the electrical condenser the possibility of a break down of the condenser is pronouncedly lessened and the condenser as a whole is substantially a stable device. Another advantage in employing a shell of molded "plastic" material, i. e., material which is not a conductor of electricity and has little, if any, heat conducting properties, is that it is unnecessary to employ a sleeve of insulating material between the condenser unit and the shell and in addition it is unnecesary to use a grommet of hard rubber or like insulating material for insulating the conductors from the externally threaded neck of the shell. A further advantage in employing a shell of the aforementioned type is that the wax filling is not likely to melt or soften when the condenser is subjected to high temperatures. A still further advantage resides in the fact that the condenser as a whole may be made of minimum size and has an exceptionally long life, and the shell is not subject to corrosion.

Another object of the invention is to provide a dry electrolytic condenser of the type and character last mentioned in which the externally threaded neck, the bottom and the side wall of the shell of molded "plastic" material are formed integrally with one another with the result that there are no joints between the neck and the bottom and between the bottom and the lower end of the continuous side wall which might become loose and thus permit moisture to enter the shell or cause loose electrical connections.

In a dry electroclytic condenser of the type and character under consideration a chemical change constantly occurs. Such change involves deformation of the positive metallic foil of the condenser unit due to slight solubility of the dielectric film that is built up on the foil in response to the anodizing action that occurs in connection with operation of the condenser. It also involves reformation of the positive foil due to the anodizing operation rebuilding the dielectric film on the foil. The anodizing operation consists essentially of oxidation of the positive foil. The oxygen is derived from the water in the electrolyte. In connection with an anodizing operation during use of the condenser the hydrogen component of the water is released. Normally the anodizing operation or process is extremely slow. Under certain conditions, however, the operation may be accelerated and in this case the hydrogen builds up excessive pressure within the shell. It is therefore another object of the invention to provide a dry electrolytic condenser having novel means for venting the shell when excessive internal pressure is built up within the shell.

A further object of the invention is to provide a dry electrolytic condenser of the last mentioned character wherein venting of the shell is obtained by having the top of the shell formed separately from the other parts of the shell and yieldingly securing the top in place by a waterproof gummy adhesive which permits opening of the top for venting purposes when excessive internal presure develops within the shell and automatically retracts the top into its closed position after release of the excessive pressure.

A still further object of the invention is to provide a dry electrolytic condenser of the type and character under consideration which is generally an improvement in the art, effectively and efficiently fulfills its intended purpose and may be manufactured at a comparatively low and reasonable cost.

Other objects of the invention and the various advantages and characteristics of the present dry electrolytic condenser will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views:

Figure 1 is a side view showing a dry electrolytic condenser embodying one form of the invention in connected or operative relation with a baseplate forming part of the chassis or frame of a radio receiver;

Figure 2 is an enlarged longitudinal section of the condenser of Figure 1, illustrating in detail the design and construction of the shell for housing the condenser unit and showing the manner in which the unit is supported within the shell by way of the wax filling constituting the sole medium for holding the unit in the shell;

Figure 2A is a fragmentary section showing the manner in which the gummy adhesive serves so to connect the top of the shell to the shell side wall that the top is permitted to open for shell venting purposes in response to excessive internal pressure in the shell;

Figure 3 is a perspective of the condenser unit, parts being shown in severed and unwrapped form for purposes of illustration; and Figure 4 is a view partly in side elevation and partly in section of a dry electrolytic condenser embodying another or modified form of the invention.

The condenser which is shown in Figures 1, 2, 2A and 3 of the drawing constitutes one form or embodiment of the invention. It is essentially of the dry electrolytic type or variety and may be used or employed in a radio receiving system or any other electrical unit or apparatus wherein one or more condensers are required. As its component parts the condenser comprises a shell 5, a self-contained dry electrolytic type condenser unit 6, a pair of flexible conductors 7 and 8 and a filling 9.

The shell 5 serves as a housing medium for the condenser unit 6 and the filling 9 and is normally positioned in an upstanding manner, as shown in Figures 1 and 2. It is rigid and consists of a cylindrical side wall 10, a circular or disc-like bottom 11, a tubular neck 12, and a circular or disc-like top 13. The side wall, bottom and neck are in the form of a one-piece unit and are formed of any solid, rigid, molded, "plastic" type resinous material having extremely high electrical and heat insulating properties. The material which is known commercial as "Bakelite" has been found in practice to be both satisfactory and practical. Such material is essentially a phenol formaldehyde resinal condensation product and is characterized by possessing extremely high electric and heat insulating properties. The bottom 11 together with the side wall and the top forms a compartment 14 for the condenser unit 6. It is formed integrally with the lower margin or end of the side wall 10 and preferably has a flat bottom face 15 for engaging the top face of a horizontally extending base plate 16. The latter forms a part of the chassis or frame of the radio receiver or other electrical unit with which the condenser is used. The neck 12 of the shell is formed integrally with, and depends from, the central portion of the bottom 11 and has the outer periphery thereof shaped to form a male or external screw thread 17. It is adapted to extend through a hole or aperture 18 in the base plate 16 and carries at its lower extremity a nut 19 for holding the condenser in clamped relation with said base plate. The nut when tightened bears against the bottom face of the base plate and serves to clamp the flat bottom face 15 of the bottom 11 against the top face of the base plate. The inner periphery of the tubular neck 12 is in the form of a bore which intersects the upper face of the shell bottom 11 and communicates with the lower end of the compartment 14. The lower end of the bore is preferably flared as at 20 in order to eliminate sharp corners at the lower inner edge of the neck. The flared lower portion of the bore is preferably formed by countersinking. For practical purposes the wall of the neck is thicker than either the bottom or side wall of the shell. The upper extremity or end of the side wall 10 is provided with an internal annular groove 21. This groove is adapted to receive the marginal portion of the top 13 and defines an upwardly facing seat 22. The top 13 is formed of the same material as the other parts of the shell, i. e., molded "plastic" type resinous material such as "Bakelite," and is slightly less in diameter than the annular groove 21. A layer or coating 23 of moisture-proof adhesive of the gummy or permanently tacky type, such, for example, as rubber cement, is provided in the groove 21 and serves releasably to secure the top 13 in place. When the top of the shell is in place the upper end of the compartment 14 is effectively sealed although if excessive or unusual internal pressure is developed within the shell the top is permitted to raise slightly for venting purposes. Because of the inherent elastic property of the adhesive the coating operates automatically to return the top of the shell to its normal closed position after a venting operation. The top together with the gummy adhesive serves, in effect, as a check valve which permits venting of the interior of the shell when excessive presure develops therein and closes the shell against inflow of air therein after a venting operation.

The condenser unit 6 is substantialy centrally positioned within the compartment 14 in the shell 5 and is in the form of a composite roll or spiral wrapping. It is embedded in, and supported by, the filling 9 and consists of a plurality of strips 24, 25, 26, 27 and 28 and an outer wrapping 29. The strips 25 and 27 constitute the positive and negative plates of the unit and are in the form of foil of aluminum or other so-called "valve" metal. Whereas it is preferred that both strips 25 and 27 be formed of foil of aluminum or other "valve" metal it is to be understood that the unit will operate satisfactorily when only the strip constituting the positive plate of the unit is formed of such material. The strips 24, 26 and 28 are formed of paper or other thin flexible sheet-like material. They are saturated or impregnated with any suitable electrolyte, such as a composition comprising glycerine or ethylene glycol, and are arranged in alternating relation with the metallic foil strips 25 and 27. The wrapping 29 surrounds and houses the strips 24, 25, 16, 27 and 28. The unit is vertically elongated and, as previously pointed out, is disposed in centered relation with the side wall 10 of the shell. The metallic foil strip 25 is electrically connected to a metallic rivet 30 on the lower end of the wrapping 29 and the other metallic foil strip, i. e., the strip 27, is electrically connected to a metallic rivet 31 also on the lower end of the wrapping 29. The two rivets serve as terminals or binding posts and are preferably disposed one diametrically opposite the other.

The conductors 7 and 8 extend or lead through the bore in the tubular neck 12 of the shell and are preferably of the covered wire type. The inner end of the conductor 7 is attached to the rivet 30 and the inner end of the conductor 8 is attached to the rivet 31.

The filling 9 is formed of high melting point wax or like truly plastic insulating material and substantially fills the compartment 14, as illustrated in Figure 2. It serves to hold the condenser unit 6 in a central position in the shell and constitutes the sole medium between the unit and the shell. As shown in Figure 2, a portion of the filling extends into and fills the bore in the externally threaded tubular neck 12 of the shell in order that it serves to hold the two conductors in place. The filling 9 is preferably formed of high melting point wax of the type which is generally used as an enclosing or sealing medium for self-contained dry type condenser units. This type of wax is generally a mineral wax of the petroleum base variety filled with resinous material and having a melting point of approximately 165° F.

In assembling the condenser the conductors 7 and 8 are inserted into the compartment 14 while the top 13 is disconnected from the side wall of the shell. The free ends thereof are then fed through the bore in the neck 12 and the condenser unit 6 is manipulated into the compartment 14. Thereafter the bore within the neck is filled with liquid wax and the latter is permitted to set. After setting of the wax in the neck the wax constituting the filling 9 is poured while in a liquid or fluid state into the compartment 14 and is allowed to set or congeal. After this step the groove 21 is coated with rubber cement, or other gummy or permanently tacky adhesive material, and the top 13 of the shell is pressed into seated relation with the seat 22 in order hermetically to seal the shell.

The herein described condenser consists of but a minimum number of parts and may be manufactured at a comparatively low or reasonable cost. It has exceptionally long life due to the fact that the shell 5 is formed of "Bakelite" or other molded "plastic" type insulating material. Because the shell is formed of such material the shell cannot form part of the electrical circuit for the condenser even though the electrolyte leaks or flows into contact with it. In addition, it is unnecessary to surround the condenser unit 6 by a seperate shell or liner of insulating material. Furthermore, it is unnecessary to employ a grommet of hard rubber or other insulating material in the externally threaded neck 12. Because the material of which the shell is formed is a heat insulator high temperatures of the atmosphere surrounding the condenser do not affect the wax filling 9 and there is little if any likelihood of the unit 6 moving into contacting relation with the side wall or bottom of the shell. Should the wax melt due to high heat conditions there will be no grounding of the condenser unit 6 even though the latter moves into contact with the shell. By reason of the fact that the neck 12 of the shell is formed of non-conducting material grounding of the unit will not occur even though the conductors 7 and 8 are brought into contacting relation with the neck. Because the bottom and side wall of the shell are in the form of a one-piece unit there are no joints between the neck and the bottom, and the bottom and the side wall which are likely to become loose and permit moisture to pass into the compartment 14. By eliminating the necessity of employing an insulating sleeve and grommet the condenser as a whole is small in size while at the same time it has maximum capacity for its size. By having the top 13 formed separately from the shell and releasably securing the top in place by gummy adhesive venting of the shell is effected when excessive pressure is developed and the shell is automatically closed when the internal pressure is normal.

The condenser which is shown in Figure 4 of the drawing constitutes a second or modified form of the invention. It is the same as the dry electrolytic condenser of Figures 1 to 3, inclusive, except that the externally threaded neck of the shell, instead of being tubular, is solid and has two metallic conductor posts 32 and 33 embedded in it and extending longitudinally therethrough. The posts are disposed in spaced relation and are fixedly united to the neck by molding the material of which the neck is formed around the two posts. The inner ends of the two posts are connected to the operating plates of the condenser unit by conductors 34 and 35 which, as shown in Figure 4, are embedded in the wax filling within the shell. The conductors 34 and 35 are preferably of such length that the free ends thereof may be soldered or otherwise electrically connected to the inner ends of the posts while the condenser unit is disposed exteriorly of the shell. After the soldering operation the unit is inserted into the shell and then the high melting point wax filling, while in a heated liquid form, is poured into the shell.

The invention is not to be understood as restricted to the details set forth since these may be modified within the scope of the appended claims without departing from the spirit and scope of the invention.

This application is a continuation-in-part of our application Serial Number 444,964, filed May 29, 1942, now abandoned.

Having thus described the invention what we claim as new and desire to secure by Letters Patent is:

1. As a new article of manufacture, an electric condenser comprising a shell formed of solid, rigid insulating material and consisting of a continuous side wall, a crosswall connected to one end of the side wall and provided with an integral, outwardly extending, single, centrally disposed, tubular neck, and a separate imperforate crosswall serving normally to close the other end of the side wall, and releasably secured in place by a layer of waterproof gummy adhesive positioned between said imperforate crosswall and said side wall so that the crosswall is permitted to move into an open position for shell venting purposes when abnormal pressure develops within the shell and is automatically retracted into its normal closed position after a venting operation and when the pressure within the shell is normal, a self-contained dry electrolytic condenser unit disposed in the shell and in spaced relation with the side and crosswalls and having a plurality of conductors leading from the plates thereof through said neck, and a filling of insulating material disposed in the space between the unit and the shell and serving to support the unit in proper spaced relation with said shell.

2. As a new article of manufacture, an electric condenser comprising a shell formed of solid, rigid insulating material and consisting of a continuous side wall, a crosswall connected to one end of the side wall and provided with an integral, outwardly extending, single, centrally disposed, tubular neck, and a separate imperforate crosswall serving normally to close the other end of the side wall, and releasably secured in place by a layer of waterproof gummy adhesive positioned between said imperforate crosswall and said side wall so that the crosswall is permitted to move into an open position for shell venting purposes when abnormal pressure develops within the shell and is automatically retracted into its normal closed position after a venting operation and when the pressure within the shell is normal, a self-contained dry electrolytic condenser unit disposed in the shell and in spaced relation with the side and crosswalls and having a plurality of conductors leading from the plates thereof through said neck, and a substantially complete filling of truly plastic wax type insulating material disposed in the space between the unit and the shell, completely incasing the unit, serving to support the unit in proper spaced relation with said shell and constituting the sole medium between said unit and walls.

3. As a new article of manufacture, an electric condenser comprising a shell formed of solid, rigid, comparatively thick, molded "plastic" resinous material having extremely high electrical and heat insulating properties, consisting of a continuous side wall, a crosswall extending across and formed integrally with one end of the side wall, provided with an integral, outwardly extending, single, centrally disposed, tubular neck, and a separate imperforate crosswall serving normally to close the other end of the side wall, and releasably secured in place by a layer of waterproof gummy adhesive positioned between said imperforate crosswall and said side wall so that the crosswall is permitted to move into an open position for shell venting purposes when abnormal pressure develops within the shell and is automatically retracted into its normal closed position after a venting operation and when the pressure within the shell is normal, a self-contained dry electrolytic condenser unit of the spirally wound strip variety disposed centrally within the shell and having a pair of flexible conductors leading from the positive and negative strips thereof through said neck, and a substantially complete filling of truly plastic wax type insulating material disposed in the space between the unit and the walls of the shell, completely incasing the unit, serving to support the unit in proper spaced relation with said shell and constituting the sole medium between said unit and walls.

4. As a new article of manufacture, an electric condenser comprising a shell formed of solid, rigid, comparatively thick, molded "plastic" resinous material having extremely high electrical and heat insulating properties, consisting of a continuous side wall, a cross wall extending across and formed integrally with one end of the side wall, provided with an integral, outwardly extending, single, centrally disposed, tubular neck, and a separate imperforate crosswall serving normally to close the other end of the side wall, and releasably secured in place by a layer of waterproof gummy adhesive positioned between said imperforate crosswall and said side wall so that the crosswall is permitted to move into an open position for shell venting purposes when abnormal pressure develops within the shell and is automatically retracted into its normal closed position after a venting operation and when the pressure within the shell is normal, a self-contained dry electrolytic condenser unit of the spirally wound strip variety disposed centrally within the shell and having a pair of flexible conductors leading from the positive and negative strips thereof through said neck, a substantially complete filling of truly plastic wax type insulating material disposed between the unit and the shell walls, completely incasing the unit, serving to support the unit in proper spaced relation with the shell, and constituting the sole medium between the unit and walls, and a filling of like truly plastic wax type insulating material in the neck and around the neck-enclosed portions of the conductors.

IRVING J. MENSCHIK.
HORACE C. KREINICK.

REFERENCES CITED

The following references are of record in the file of this patent:

UNITED STATES PATENTS

| Number | Name | Date |
| --- | --- | --- |
| 1,744,302 | Engle et al. | Jan. 21, 1930 |
| 1,836,707 | Dubilier | Dec. 15, 1931 |
| 2,130,073 | Delange | Sept. 13, 1938 |
| 2,146,029 | Schimkus | Feb. 7, 1939 |
| 2,209,871 | Brennan | July 30, 1940 |
| 2,220,887 | Claassen | Nov. 12, 1940 |
| 2,234,042 | Deeley | Mar. 4, 1941 |
| 2,267,717 | Brennan | Dec. 30, 1941 |
| 2,285,136 | Abendroth | June 2, 1942 |
| 2,307,561 | Bailey | Jan. 5, 1943 |